United States Patent
Fukusada (10) Patent No.: US 11,132,155 B2
(45) Date of Patent: Sep. 28, 2021

(54) IMAGE FORMING APPARATUS HAVING MAIN BODY, MAIN MEMORY AND CONTROLLER, AND CONSUMABLE CARTRIDGE HAVING CARTRIDGE MEMORY THEREFOR

(71) Applicant: Brother Kogyo Kabushiki Kaisha, Nagoya (JP)

(72) Inventor: Yuki Fukusada, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/002,861

(22) Filed: Aug. 26, 2020

(65) Prior Publication Data

US 2021/0096793 A1    Apr. 1, 2021

(30) Foreign Application Priority Data

Sep. 27, 2019  (JP) .............................. JP2019-176819

(51) Int. Cl.
   *G06F 3/12*   (2006.01)
(52) U.S. Cl.
   CPC ............ *G06F 3/1235* (2013.01); *G06F 3/121* (2013.01)
(58) Field of Classification Search
   None
   See application file for complete search history.

(56) References Cited

U.S. PATENT DOCUMENTS

| | | | |
|---|---|---|---|
| 2004/0207865 A1* | 10/2004 | Wachter | H04N 1/2376 358/1.15 |
| 2006/0192993 A1* | 8/2006 | Omotani | B41J 2/17503 358/1.15 |
| 2006/0291876 A1* | 12/2006 | Kawai | G03G 15/55 399/24 |
| 2008/0219692 A1* | 9/2008 | Kondo | G03G 21/1882 399/83 |
| 2011/0274443 A1* | 11/2011 | Tohata | G03G 15/0877 399/12 |
| 2013/0077981 A1* | 3/2013 | Homma | G03G 21/1878 399/12 |
| 2013/0108282 A1* | 5/2013 | Sonoda | G03G 15/0856 399/12 |
| 2017/0182784 A1* | 6/2017 | Jeran | B41J 2/17546 |
| 2018/0086091 A1 | 3/2018 | Jeran | |

* cited by examiner

*Primary Examiner* — Henok Shiferaw
(74) *Attorney, Agent, or Firm* — Burr & Brown, PLLC (57) ABSTRACT

An image forming apparatus includes a consumable cartridge and a main body. The consumable cartridge includes a cartridge memory storing usage information and identifying information. The main body includes a main memory and a controller. The controller stores the identifying information stored in the cartridge memory in the main memory and rewrites the usage information stored in the cartridge memory into information indicating that the consumable cartridge is used in a case where the usage information indicates that the consumable cartridge is unused. The controller allows the image forming apparatus to execute printing in a case where the usage information indicates that the consumable cartridge is used and the identifying information stored in the cartridge memory is stored in the main memory or executes a specific error process in a case where the usage information indicates that the consumable cartridge is used and the identifying information stored in the cartridge memory is not stored in the main memory.

22 Claims, 9 Drawing Sheets

IMAGE FORMING APPARATUS HAVING MAIN BODY, MAIN MEMORY AND CONTROLLER, AND CONSUMABLE CARTRIDGE HAVING CARTRIDGE MEMORY THEREFOR

CROSS-REFERENCE TO RELATED APPLICATION

This application claims priority under 35 U.S.C. § 119 from Japanese Patent Application No. 2019-176819 filed on Sep. 27, 2019. The entire subject matter of the application is incorporated herein by reference.

BACKGROUND

Technical Field

Aspects of the present disclosure relate to image forming apparatuses and consumable cartridges.

Related Art

As a conventional art, a printing material cartridge that has a memory is known. The memory can exchange information with a printer controller when the cartridge is mounted to a printer. In the conventional art, the memory includes a first write-once read-only memory having a first memory address and a second write-once read-only memory having a second memory address. The first write-once read-only memory includes information that prompts the printer controller to write a printer identifier on the second write-once read-only memory. The memory further includes a memory controller. The memory controller is configured to execute storing and searching of data in the write-once read-only memories.

SUMMARY

In the conventional art, when a cartridge is mounted to a printer, a printer identifier of the printer is written on the memory of the cartridge. Then, in an authentication process, the printer controller compares the printer identifier of the printer with a printer identifier stored in the memory of the cartridge. In a case where the printer identifier of the printer matches with the printer identifier stored in the memory of the cartridge, the controller determines that the cartridge can be used, while in a case where the printer identifier of the printer does not match with the printer identifier stored in the memory of the cartridge, the controller determines that the cartridge cannot be used.

However, in the conventional art, the printer identifier needs to be written in the memory of the cartridge. In general, the number of digits of the printer identifier tends to increase as the number of printers increases. Therefore, in some cases, a writing time required to write the printer identifier on the memory becomes longer as the length of the printer identifier gets longer. In such cases, there is a risk that writing error occurs due to removal of the toner cartridge while the printer controller is writing the printer identifier on the memory.

According to aspects of the present disclosure, there is provided an image forming apparatus including a consumable cartridge and a main body. The consumable cartridge includes a cartridge memory having a first area configured to store usage information indicating whether the consumable cartridge is unused and a second area configured to store identifying information for identifying the consumable cartridge. The main body includes a main memory and a controller. The controller executes a storing process of storing the identifying information stored in the second area in the main memory in a case where the usage information stored in the first area indicates that the consumable cartridge is unused, a first rewriting process of rewriting the usage information stored in the first area into information indicating that the consumable cartridge is used in a case where the usage information stored in the first area indicates that the consumable cartridge is unused, and a first control process including a process of allowing the image forming apparatus to execute printing in a case where the usage information stored in the first area indicates that the consumable cartridge is used and the identifying information stored in the second area is stored in the main memory or a process of executing a specific error process in a case where the usage information stored in the first area indicates that the consumable cartridge is used and the identifying information stored in the second area is not stored in the main memory.

According to aspects of the present disclosure, there is further provided a consumable cartridge including a cartridge memory including a first area storing usage information indicating a usage state of the consumable cartridge and a second area storing identifying information for identifying the consumable cartridge. The identifying information stored in the second area is to be stored in a main memory of an image forming apparatus and the usage information stored in the first area is rewritable into information indicating that the consumable cartridge is used in a case where the usage information stored in the first area indicates that the consumable cartridge is unused. Printing of the image forming apparatus is to be allowed in a case where the usage information stored in the first area indicates that the consumable cartridge is used and the identifying information stored in the second area is stored in the main memory. A specific error process of the image forming apparatus is to be executed in a case where the usage information stored in the first area indicates that the consumable cartridge is used and the identifying information stored in the second area is not stored in the main memory.

DETAILED DESCRIPTION

1. First Embodiment

Hereinafter, embodiments of the present disclosure will be described with reference to the accompanying drawings.

Figure 1:
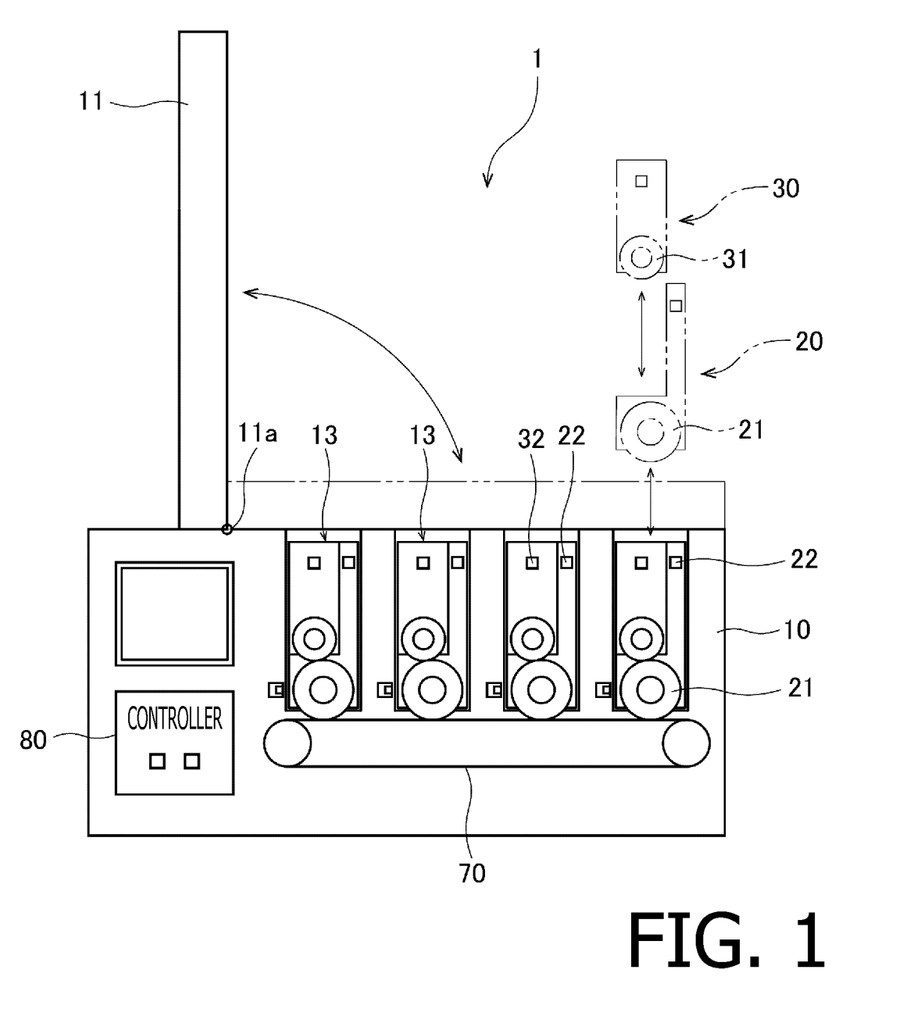
FIG. 1 is a schematic view of an image forming apparatus.
Figure 2:
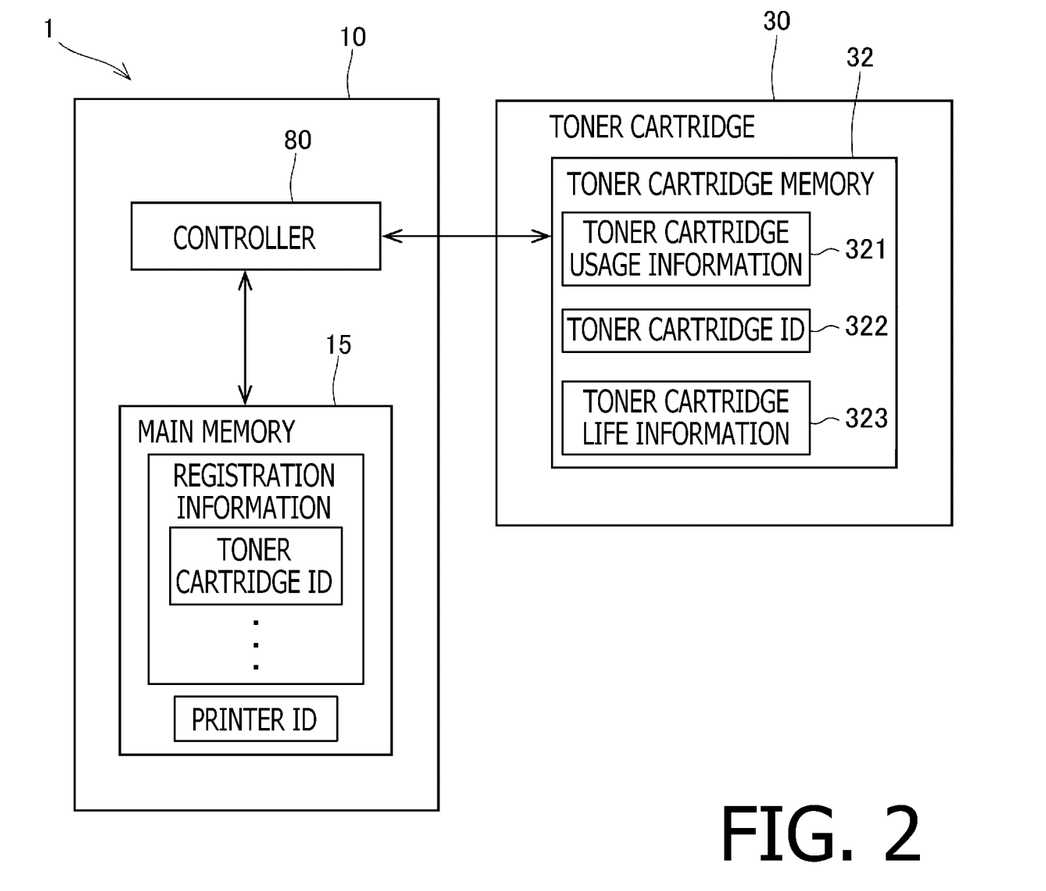
FIG. 2 is a diagram showing an electrical configuration illustrating a connection between a controller and a toner memory.

FIG. 1 is a schematic view of an image forming apparatus 1. FIG. 2 is a diagram showing an electrical configuration illustrating a connection between a controller 80 and a toner memory 32. The image forming apparatus 1 is an electrophotographic printer. An example of the image forming apparatus 1 is an LED printer. The image forming apparatus 1 includes a main body 10, a cover 11, a main memory 15 (See FIG. 2), four drum cartridges 20, four toner cartridges 30, four conventionally known light source units, a transfer belt 70 and the controller 80. The drum cartridges 20 and the toner cartridges 30 are examples of a consumable cartridge.

The main body 10 is a substantially rectangular box. The main memory 15, the four drum cartridges 20, the four toner cartridges 30, the transfer belt 70 and the controller 80 are accommodated in the main body 10. The main body 10 has four cartridge holding parts 13. Each cartridge holding part 13 has an opening. On an outer surface of the main body 10, a displaying part such as a liquid crystal display or a lamp and an input part such as one or more buttons may be provided. A touch panel may be provided to the liquid crystal display to function as the input part.

Each toner cartridge 30 includes a developing roller 31 and a body that can accommodate developer (e.g., toner) as printing material. The four toner cartridges 30 respectively accommodate developer of different colors (e.g., cyan, magenta, yellow and black). It should be noted that, in the following description, a direction in which rotation axes (developing axes) of the developing rollers 31 of the four toner cartridges 30 extend is referred to as a "first direction." That is, the developing rollers 31 are cylindrical members extending in the first direction and are rotatable about respective developing axes extending in the first direction.

The cover 11 is swingable, about a swing axis 11a extending in the first direction, between an open position shown with solid lines in FIG. 1 and a closed position shown with chain double-dashed lines in FIG. 1. When the cover 11 is at the open position, the four openings of the four toner cartridges 13 are exposed to outside. When the cover 11 is at the closed position, the four openings of the four toner cartridges 13 are covered with the cover 11.

The drum cartridge 20 to which the toner cartridge 30 is mounted is also called a process cartridge. The drum cartridge 20 can be attached to and detached from the cartridge holding part 13 in a state where the toner cartridge 30 is mounted. That is, the process cartridge can be attached to and detached from the cartridge holding part 13.

The drum cartridge 20 includes a photosensitive drum 21. The photosensitive drum 21 is a cylindrical member extending in the first direction. The photosensitive drum 21 is rotatable about a drum axis extending in the first direction. An outer periphery of the photosensitive drum 21 is covered with photosensitive material. The drum cartridge 20 further includes a drum cartridge memory 22. The drum cartridge memory 22 is positioned at an outer surface of the drum cartridge 20 of one side in the first direction. The drum cartridge memory 22 is a readable and writable memory. The drum cartridge memory 22 is, for example, a flash ROM or an EEPROM.

The drum cartridge memory 22 stores pieces of information relating to the photosensitive drum 21 of the drum cartridge 20. Specifically, the drum cartridge memory 22 stores a drum cartridge ID (a drum cartridge identifier) and drum cartridge life information. The drum cartridge ID is a serial number for identifying each drum cartridge 20. The drum cartridge life information is, for example, at least one of a cumulative number of rotations of the photosensitive drum 21 and a cumulative number of sheets printed using the photosensitive drum 21. The cumulative number of rotations of the photosensitive drum 21 is a number of rotations that is incremented or decremented, for each drum cartridge 20 identified by the drum cartridge ID, each time printing is executed. The cumulative number of sheets printed using the photosensitive drum 21 is a number of sheets printed that is incremented or decremented, for each drum cartridge 20 identified by the drum cartridge ID, each time printing is executed.

The drum cartridge memory 22 may also store other pieces of information such as models adapted to the drum cartridge 20, specifications of the drum cartridge 20, information indicating whether the drum cartridge 20 is new or not, information indicating whether the drum cartridge 20 is a genuine product, and error history of the drum cartridge 20.

In a state where the toner cartridge 30 is mounted to the drum cartridge 20, an outer periphery of the photosensitive drum 21 contacts with an outer periphery of the developing roller 31. The toner cartridge 30 includes a toner memory 32. The toner memory 32 is positioned at an outer surface of the toner cartridge 30 on one side in the first direction. The toner memory 32 is a readable and writable memory. The toner memory 32 is, for example, a flash ROM or an EEPROM.

The toner memory 32 stores pieces of information relating to the toner cartridge 30. Specifically, the toner memory 32 includes a first area 321 storing toner usage information, a second area 322 storing a toner cartridge ID (a toner cartridge identifier), and a third area 323 storing toner cartridge life information. The first area 321 and the third area 323 of the toner cartridge memory 32 are configured such that data can be rewritten multiple times.

The toner cartridge usage information is information indicating whether the toner cartridge 30 is unused or not. In the first embodiment, the toner cartridge usage information indicates that the toner cartridge 30 is unused (Hereinafter simply referred to as "unused."), that the toner cartridge 30 is used but there is life remaining (Hereinafter simply referred to as "used."), or that the toner cartridge 30 is used and the end of life is reached (Hereinafter simply referred to as "no remaining life.").

The toner cartridge ID is, for example, a serial number for identifying each toner cartridge 20. A data length (a number of bits) of the toner cartridge ID is longer than a data length of the toner cartridge usage information.

The toner cartridge life information is, for example, at least one of a cumulative number of rotations of the developing roller 31, a cumulative number of sheets printed using the developing roller 31, and a cumulative number of dots printed using the developing roller 31. The cumulative number of rotations of the developing roller 31 is a number of rotations that is incremented or decremented, for each toner cartridge 30 identified by the toner cartridge ID, each time printing is executed. The cumulative number of sheets printed using the developing roller 31 is a number of sheets printed that is incremented or decremented, for each toner cartridge 30 identified by the drum cartridge ID, each time printing is executed. The cumulative number of dots printed using the developing roller 31 is a number of dots printed that is incremented or decremented, for each toner cartridge 30 identified by the drum cartridge ID, each time printing is executed.

As shown in FIG. 1, the drum cartridge 20 to which the toner cartridge 30 is mounted is inserted in the cartridge holding part 13 of the main body 10 through the opening in a state where the cover 11 is at the open position.

The four light source units are attached on an inner surface of the cover 11. Each light source unit faces the outer periphery of the photosensitive drum 21 in a state where the drum cartridge 20 is mounted to the main body 10 and the cover 11 is at the closed position. Each light source unit includes a plurality of light sources arranged in the first direction. The light sources can irradiate lights on the outer periphery of the photosensitive drum 21. The light sources are, for example, LEDs (Light Emitting Diodes).

The light source units are electrically connected to the controller 80. The controller 80 causes the plurality of light sources of the light source units to emit lights in accordance with received image data. By this configuration, the light sources irradiate lights on the outer periphery of the photosensitive drums 21. As a result, the photosensitive materials on the outer peripheries of the photosensitive drums 21 are exposed in accordance with the image data.

The transfer belt 70 is a circular belt (an endless belt) and is wound around a drive roller and a driven roller. The drive roller and the driven roller are cylindrical members extending in the first direction and are rotatable about respective axes extending in the first direction. The drive roller drives the transfer belt 70. The controller 80 causes the drive roller to rotate. The driven roller rotates in accordance with movement of the transfer belt 70 driven by the drive roller. In a state where the drum cartridges 20 are inserted in respective cartridge holding parts 13, the outer peripheries of the photosensitive drums 21 contact an outer periphery of the transfer belt 70. When executing printing, printing paper passes between the transfer belt 70 and the photosensitive drums 21.

The controller 80 includes, for example, an ASIC (an Application Specific Integrated Circuit). The controller 80 is electrically connected to the main memory 15 provided in the main body 10. The controller 80 executes various processes to cause the image forming apparatus 1 to execute a printing process and one or more associated processes. It should be noted that the controller 80 may include a processor such as a CPU (processor). In this case, one or more computer programs may be stored in the main memory 15 and the controller 80 may cause the image forming apparatus 1 to execute processes such as the printing process by causing the processor to operate in accordance with the one or more computer programs.

When the toner cartridge 30 mounted to the drum cartridge 20 is mounted in the cartridge holding part 13 of the main body 10, the toner cartridge memory 32 is electrically connected to the controller 80 as shown in FIG. 2. Therefore, the controller 80 can execute reading of information from the toner cartridge memory 32 and writing (including rewriting) of information in the toner cartridge memory 32. Furthermore, although not shown in the figures, when the drum cartridge 20 is mounted in the cartridge holding part 13 of the main body 10, the drum cartridge memory 22 is electrically connected to the controller 80. Therefore, the controller 80 can execute reading of information from the drum cartridge memory 22 and writing (including rewriting) of information in the drum cartridge memory 22.

The main memory 15 is a readable and writable memory. The main memory 15 is, for example, a flash ROM or an EEPROM. As will be described later, the main memory 15 stores the toner cartridge ID that is read from the toner cartridge memory 32. The main memory 15 further stores a printer ID. The printer ID is a piece of identifying information for identifying each main body 10 and is, for example, a serial number. A data length of the printer ID is longer than the data length of the toner cartridge usage information.

Figure 3:
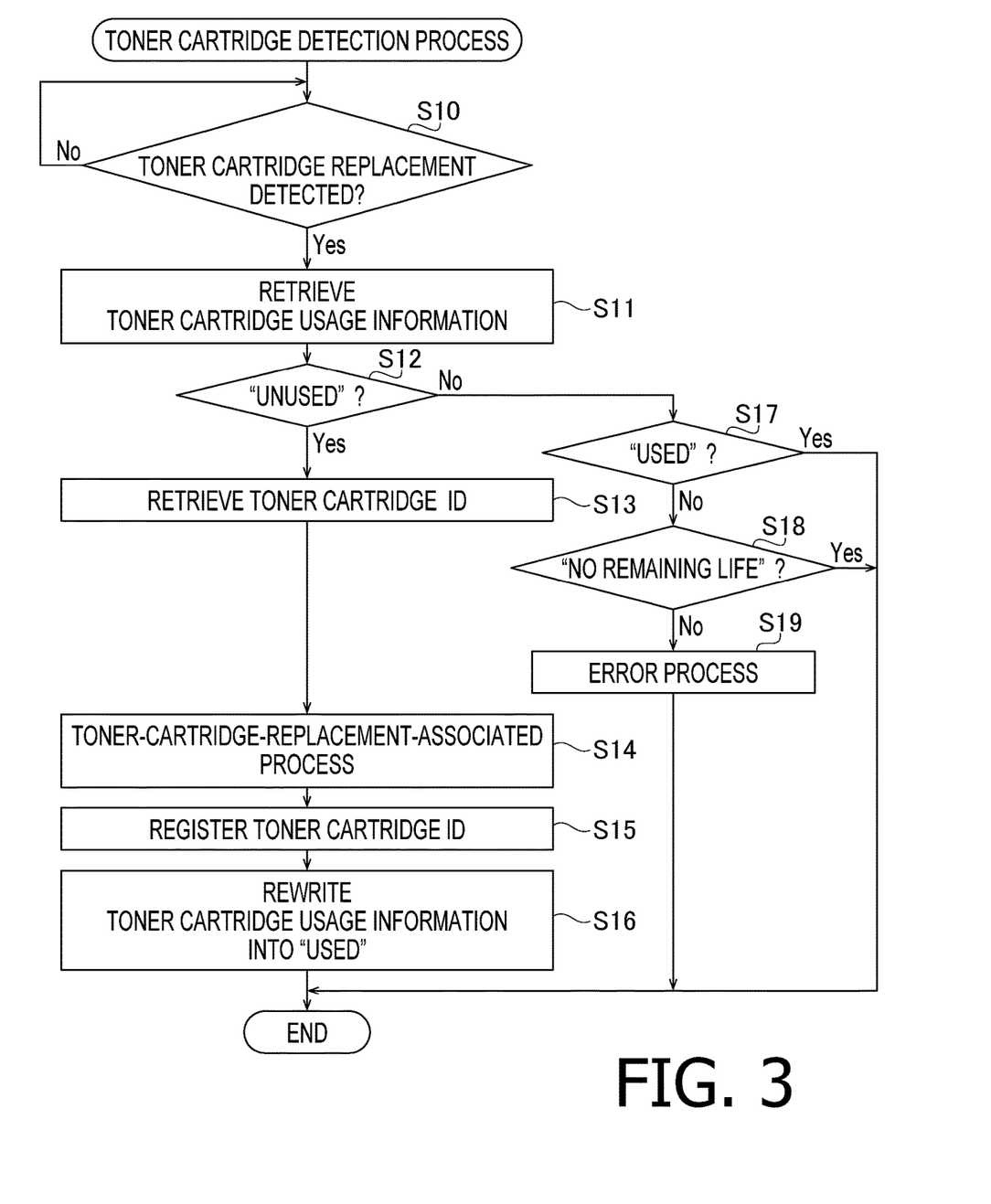
FIG. 3 is a diagram showing a flow of a toner cartridge detection process that a controller of the first embodiment executes.

FIG. 3 is a diagram showing a flow of a toner cartridge detection process that the controller of the first embodiment executes. The toner cartridge detection process shown in FIG. 3 is a process that the controller 80 executes in a case where the toner cartridge 30 is mounted to the main body 10. First, the controller 80 executes a replacement detection determination process S10 for determining whether replacement of the toner cartridge 30 is detected. In the replacement detection determination process S10, the controller 80 may determine that the replacement of the toner cartridge 30 has been detected for example if the image forming apparatus 1 has been turned on, if a contact sensor has detected opening and closing of the cover 11, or if the controller 80 has become able to communicate with the toner cartridge 30.

If it is determined in the replacement detection determination process S10 that the replacement of the toner cartridge 30 has been detected, the controller 80 executes a reading process S11 for reading the toner cartridge usage information stored in the first area 321 of the toner cartridge memory 32.

The controller 80 executes a first determination process S12 for determining whether the toner cartridge usage information that is read by the reading process S11 indicates "unused."

If it is determined in the first determination process S12 that the toner cartridge usage information indicates "unused," the controller 80 executes a reading process S13 for reading the toner cartridge ID stored in the second area 322. The controller 80 further executes a toner-cartridge-replacement-associated process S14. The toner-cartridge-replacement-associated process S14 is a process associated with the replacement of the toner cartridge 30. The controller 80 also executes a storing process S15 for storing the toner cartridge ID that is read by the reading process S13 in the main memory 15. In the storing process S15, as shown in FIG. 2, the toner cartridge ID is stored in the main memory 15 as registration information.

After the storing process S15, the controller 80 executes a first rewriting process S16 for rewriting the toner cartridge usage information stored in the first area 321 into information indicating that the toner cartridge 30 is used. Specifically, in the first rewriting process S16, the controller 80 rewrites the toner cartridge usage information from the information indicating that the toner cartridge 30 is unused into information indicating that the toner cartridge 30 is used (i.e., information indicating that the toner cartridge 30 is used but there is life remaining). When the first rewriting process S16 is completed, the controller 80 terminates the toner cartridge detection process.

If it is determined in the first determination process S12 that the toner cartridge usage information that is read by the reading process S11 does not indicate "unused," the controller 80 executes a determination process S17 for determining whether the toner cartridge usage information indicates "used." If it is determined in the determination process S17 that the toner cartridge usage information indicates "used," the controller 80 terminates the toner cartridge detection process.

If is it determined in the determination process S17 that the toner cartridge usage information that is read by the reading process S11 does not indicate "used," the controller 80 executes a determination process S18 for determining whether the toner cartridge usage information indicates "no remaining life." If it is determined in the determination process S18 that the toner cartridge usage information indicates "no remaining life," the controller 80 terminates the toner cartridge detection process. On the other hand, if it is determined in the determination process S18 that the toner cartridge usage information does not indicate "no remaining life," the controller 80 executes a specific error process S19. The error process S19 is, for example, a process for inhibiting printing with the image forming apparatus 1. The error process S19 may also be a process for displaying an error screen indicating that the toner cartridge 30 that is mounted is not an appropriate one on the liquid crystal display or a process for lighting the lamp.

Figure 4:
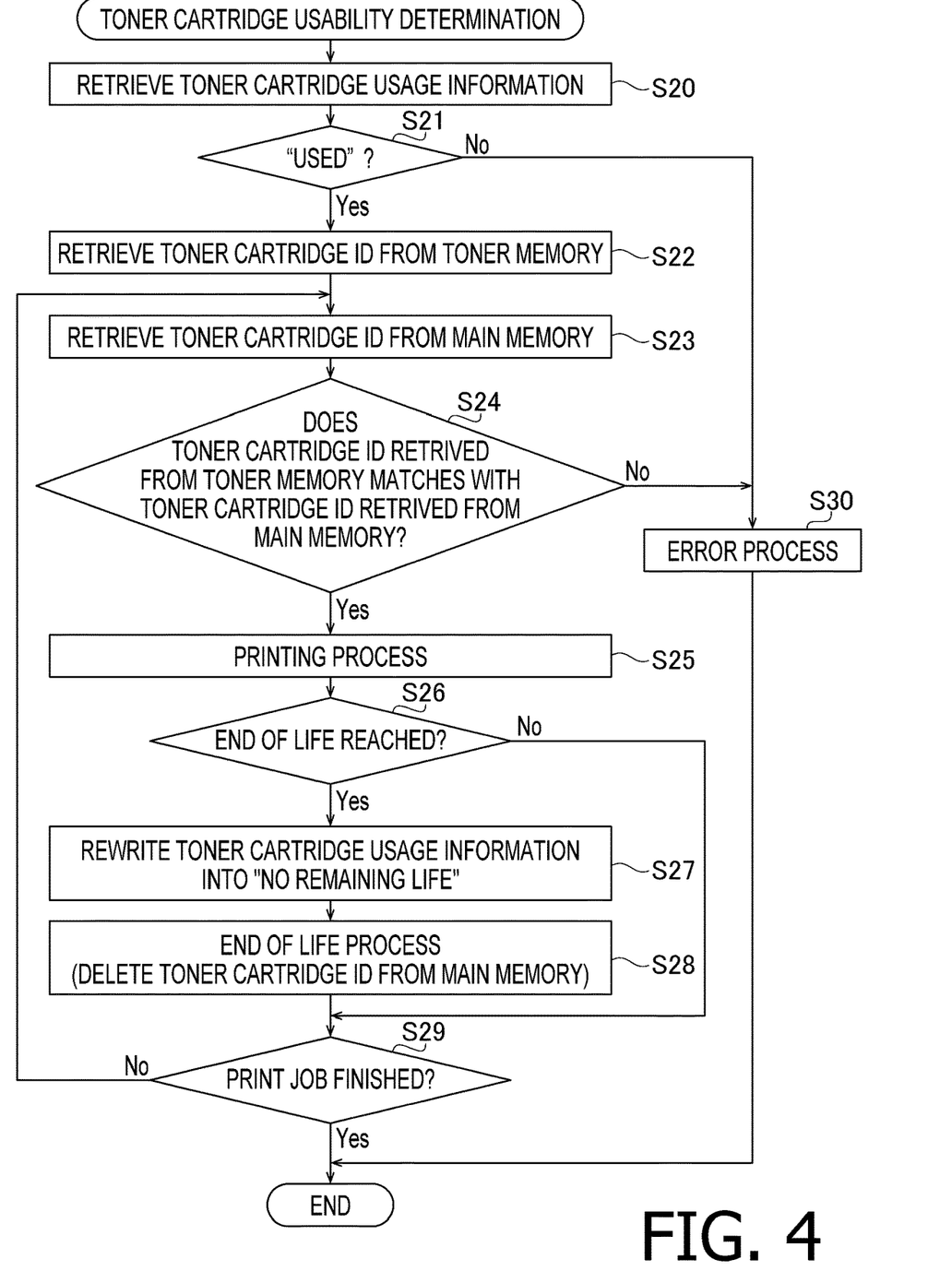
FIG. 4 is a diagram showing a flow of a toner cartridge usability determination process that the controller of the first embodiment executes.

FIG. 4 is a diagram showing a flow of a toner cartridge usability determination process that the controller 80 of the first embodiment executes. The toner cartridge usability determination process is a process in which the controller 80 determines whether a toner cartridge 30 mounted to the main body 10 is allowed to use. In the present embodiment, the toner cartridge usability determination process may be executed each time a printing process is to be executed with the image forming apparatus 1. Processes S21-S24 and S30 which will be described later may be executed after the toner cartridge detection process, that is, in a case where the toner cartridge 30 mounted to the drum cartridge 20 is mounted in the cartridge holding part 13 of the main body 10, regardless of whether a printing process is to be executed or not.

When the toner cartridge usability determination process is started, the controller 80 executes a reading process S20 for reading the toner cartridge usage information stored in the first area 321. Then, the controller 80 executes a second determination process S21 for determining whether the toner cartridge usage information that is read by the reading process S20 indicates "used."

If it is determined in the second determination process S21 that the toner cartridge usage information indicates "used," the controller 80 executes a reading process S22 for reading the toner cartridge ID stored in the second area 322. The controller 80 further executes a reading process S23 for reading the toner cartridge ID stored in the main memory 15. The toner cartridge ID stored in the main memory 15 is information that has been registered in the storing process S15 shown in FIG. 3.

Then, the controller 80 executes a third determination process S24 for determining whether the toner cartridge ID that is obtained by the reading process S22 matches with the toner cartridge ID that is obtained by the reading process S23. In other words, the third determination process S24 is a process for determining whether the toner cartridge ID stored in the second area 322 is stored in the main memory 15.

If it is determined in the third determination process S24 that the toner cartridge ID that is obtained by the reading process S22 matches with the toner cartridge ID that is obtained by the reading process S23, that is, if it is determined that the toner cartridge ID stored in the second area 322 is stored in the main memory 15, the controller 80 execute a printing process S25 using the toner cartridge 30.

When the printing process is completed, the controller 80 executes a life determination process S26 for determining whether the toner cartridge life information stored in the third area 323 exceeds a set threshold value. For example, if the toner cartridge life information is the information indicating the cumulative number of rotations of the developing roller 31, the set threshold value is a set number of rotations that the developing roller 31 can withstand.

If it is determined in the life determination process S26 that the toner cartridge life information exceeds the set threshold value, the controller 80 executes a second rewriting process S27 for rewriting the toner cartridge usage information stored in the first area 321 into information indicating "no remaining life." That is, by the second rewriting process S27, the toner cartridge usage information is rewritten into information indicating that the toner cartridge 30 is used and there is no life remaining.

After the second rewriting process S27, the controller 80 executes an end of life process S28. The end of life process S28 includes, for example, a process in which the controller 80 deletes the toner cartridge ID of the toner cartridge 30 that is mounted from the main memory 15. The end of life process S28 may also include a process in which the controller 80 indicates, through a screen or a lamp, that the toner cartridge 30 has reached the end of life.

When the end of life process S28 is finished, the controller 80 executes a completion determination process S29 for determining whether all of one or more print jobs are completed. If it is determined in the completion determination process S29 that all of one or more print jobs are completed, the controller 80 terminates the cartridge usability determination process. If it is determined in the completion determination process S29 that not all of one or more print jobs are completed, the controller 80 goes back to the reading process S23.

If it is determined in the life determination process S26 that the toner cartridge life information does not exceed the set threshold value, the controller 80 skips the second rewriting process S27 and the end of life process S28 and executes the completion determination process S29.

If it is determined in the second determination process S21 that the toner cartridge usage information does not indicate "used," the controller 80 execute a specific error process S30. If it is determined in the third determination process S24 that the toner cartridge ID that is obtained by the reading process S22 does not match with the toner cartridge ID that is obtained by the reading process S23, that is, if it is determined that the toner cartridge ID stored in the second area 322 is not stored in the main memory 15, the controller 80 execute the error process S30.

The error process S30 is, for example, a process for inhibiting printing using the image forming apparatus 1. The error process S30 may also include a process for indicating, through the liquid crystal display or the lamp, that the toner cartridge 30 that is mounted is not an appropriate one.

In the image forming apparatus 1, in a case where the toner cartridge 30 is mounted to the main body 10 for replacement or the like, the toner cartridge detection process is executed. Then, if the toner cartridge 30 of which the toner cartridge usage information indicates "unused" has been mounted to the main body 10, the toner cartridge ID of the mounted toner cartridge 30 is stored in the main memory 15 (storing process S15). Therefore, it becomes possible for the controller 80 to manage the toner cartridge 30. Furthermore, the toner cartridge usage information is changed from the information indicating "unused" to the information indicating "used" (first rewriting process S16). Therefore, the toner cartridge 30 that is once mounted to the main body 10 of the image forming apparatus 1 can be identified, from the toner cartridge usage information, to be the one that has been "used" even if the toner cartridge 30 is mounted to the main body 10 of the other image forming apparatus 1.

When using the toner cartridge 30 in a printing process, the toner cartridge usability determination process shown in FIG. 4 is executed. If the toner cartridge usage information indicates "used," it is determined whether the toner cartridge ID stored in the toner cartridge memory 32 is stored in the main memory 15 (the third determination process S24). If the toner cartridge ID stored in the toner cartridge memory 32 is stored in the main memory 15, the toner cartridge 30 is allowed to be used as being a toner cartridge of which the toner cartridge ID has been stored in the main memory 15 in the storing process S15 of the toner cartridge detection process, and the printing process S25 is executed. On the other hand, if the toner cartridge ID of the toner cartridge 30 of which the toner cartridge usage information indicates "used" is not stored in the main memory 15, the error process S30 is executed.

If the toner cartridge 30 that has once been mounted to one main body 10 is mounted to another main body 10, since the toner cartridge usage information indicates "used," the toner cartridge ID will not be stored in the main memory 15. As a result, it will be determined in the third determination process S24 that the toner cartridge ID is not stored in the memory 15 and the error process S30 will be executed. Therefore, it is possible to suppress usage of the toner cartridge that has once been mounted to one main body 10 in another main body 10. That is, it is possible to suppress usage of the toner cartridge 30 in other apparatuses by writing the usage information, the information being different from the printer ID (the printer identifier), in the toner cartridge memory 32.

Furthermore, if the toner cartridge 30 has reached the end of life, the toner cartridge usage information will be rewritten into the information indicating "no remaining life" by the second rewriting process S27 and the toner cartridge ID will be deleted from the main memory 15 by the end of life process S28. Therefore, in the process for executing the subsequent printing process, it will be determined in the third determination process S24 that the toner cartridge ID is not stored in the main memory 15 and thus it is possible to suppress usage of the toner cartridge 30 with "no remaining life".

In the image forming apparatus 1, the controller writes the toner cartridge usage information to the toner cartridge memory 32. The data length of the toner cartridge usage information can be set to be a length that is enough to make a plurality of usage states of the toner cartridge 30 (in the present embodiment, "unused," "used" and "no remaining life") identifiable (e.g., equal to or less than 5 bits, and more preferably, equal to or less than 3 bits). Therefore, it is possible to make the data length of the toner cartridge usage information shorter than the data length of the printer ID. As a result, it becomes possible to make time required to write information to the toner cartridge memory 32 relatively shorter (e.g., it becomes possible to make the time shorter than in a case where the printer ID is to be written to the toner cartridge memory 32). Accordingly, writing error becomes less likely to occur and thus it becomes possible to appropriately manage the toner cartridge 30.

The toner cartridge usage information stored in the toner cartridge memory 32 may be encrypted with a secret key. In this case, the controller 80 may execute a process for decrypting the toner cartridge usage information that is read from the toner cartridge memory 32. The controller 80 may encrypt the toner cartridge usage information with a secret key and write the encrypted toner cartridge usage information to the toner cartridge memory 32. The toner cartridge ID and the toner cartridge life information may also be encrypted with a secret key that is common to or different from that for the toner cartridge usage information. It is possible to suppress leakage of the toner cartridge usage information, the toner cartridge ID and the toner cartridge life information to outside by encrypting these pieces of information.

2. Second Embodiment

In the first embodiment, the toner cartridge usage information is set to information indicating one of the three usage states, namely, "unused," "used" and "no remaining life." However, the usage states are not limited to the above.

The controller 80 according to the second embodiment operates in one of a plurality of operation modes. Specifically, the controller 80 operates in one of a "contract mode" and a "normal mode." The "contract mode" is an operation mode in which the controller 80 limits the toner cartridges 30 to be allowed to be used in the image forming apparatus 1 to the toner cartridges 30 that are supplied in accordance with a contract (hereinafter referred to as a "contract toner cartridge 30"). The "normal mode" is an operation mode in which the controller 80 limits the toner cartridges 30 to be allowed to be used in the image forming apparatus 1 to normal toner cartridges 30 that are different from the contract toner cartridges 30 (hereinafter referred to as a "normal toner cartridge 30"). That is, in the contract mode, the normal toner cartridges 30 are not allowed to be used, and in the normal mode, the contract toner cartridges 30 are not allowed to be used.

In the second embodiment, in order to discriminate the contract cartridge 30 from the normal cartridge 30, the toner cartridge usage information indicates the operation mode and the usage state. Specifically, the toner cartridge usage information is information indicating one of six usage states, namely, "unused contract toner cartridge," "used contract toner cartridge" and "contract toner cartridge having no remaining life" for the contract mode and "unused normal toner cartridge," "used normal toner cartridge" and "normal toner cartridge having no remaining life" for the normal mode. The toner cartridge usage information to be assigned to the contract toner cartridge 30 is information indicating one of "unused contract toner cartridge," "used contract toner cartridge" and "contract toner cartridge having no remaining life" for the contract mode. The toner cartridge usage information to be assigned to the normal toner cartridge 30 is information indicating one of "unused normal toner cartridge," "normal/used" and "normal toner cartridge having no remaining life" for the normal mode.

In the second embodiment, the controller 80 executes an operation mode setting process for setting the operation mode. The operation mode may be changeable by the controller 80 in accordance with an input through the input part such as a button or may be fixed to an operation mode initially set by the controller 80.

Figure 5:
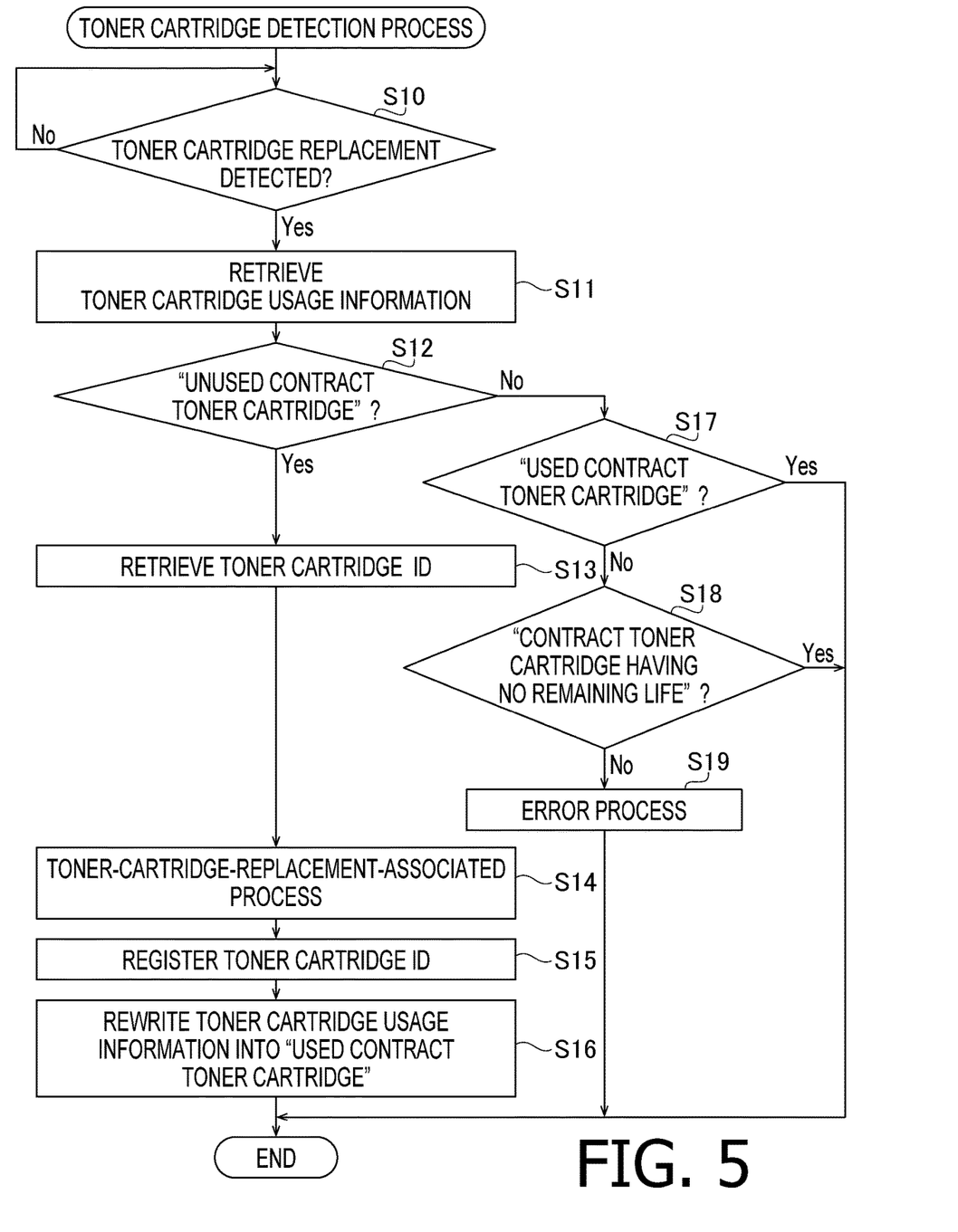
FIG. 5 is a diagram showing a flow of a toner cartridge detection process that a controller of the second embodiment executes in a contract mode.

Next, toner cartridge detection processes and toner cartridge usability determination processes that the controller 80 executes in the contract mode and the normal mode, respectively, will be described. FIG. 5 is a diagram showing a flow of a toner cartridge detection process that the controller 80 of the second embodiment executes in the contract mode. The toner cartridge detection process in the contract mode is almost the same as the toner cartridge detection process of the first embodiment shown in FIG. 3. It should be noted that, in the contract mode, the controller 80 determines in the first determination process S12 whether the toner cartridge usage information indicates "unused contract toner cartridge," determines in the determination process S17 whether the toner cartridge usage information indicates "contract/used," and determines in the determination process S18 whether the toner cartridge usage information indicates "contract toner cartridge having no remaining life." Also, in the first rewriting process S16, the controller 80 rewrites the toner cartridge usage information stored in the first area into information indicating "contract/used."

Figure 6:
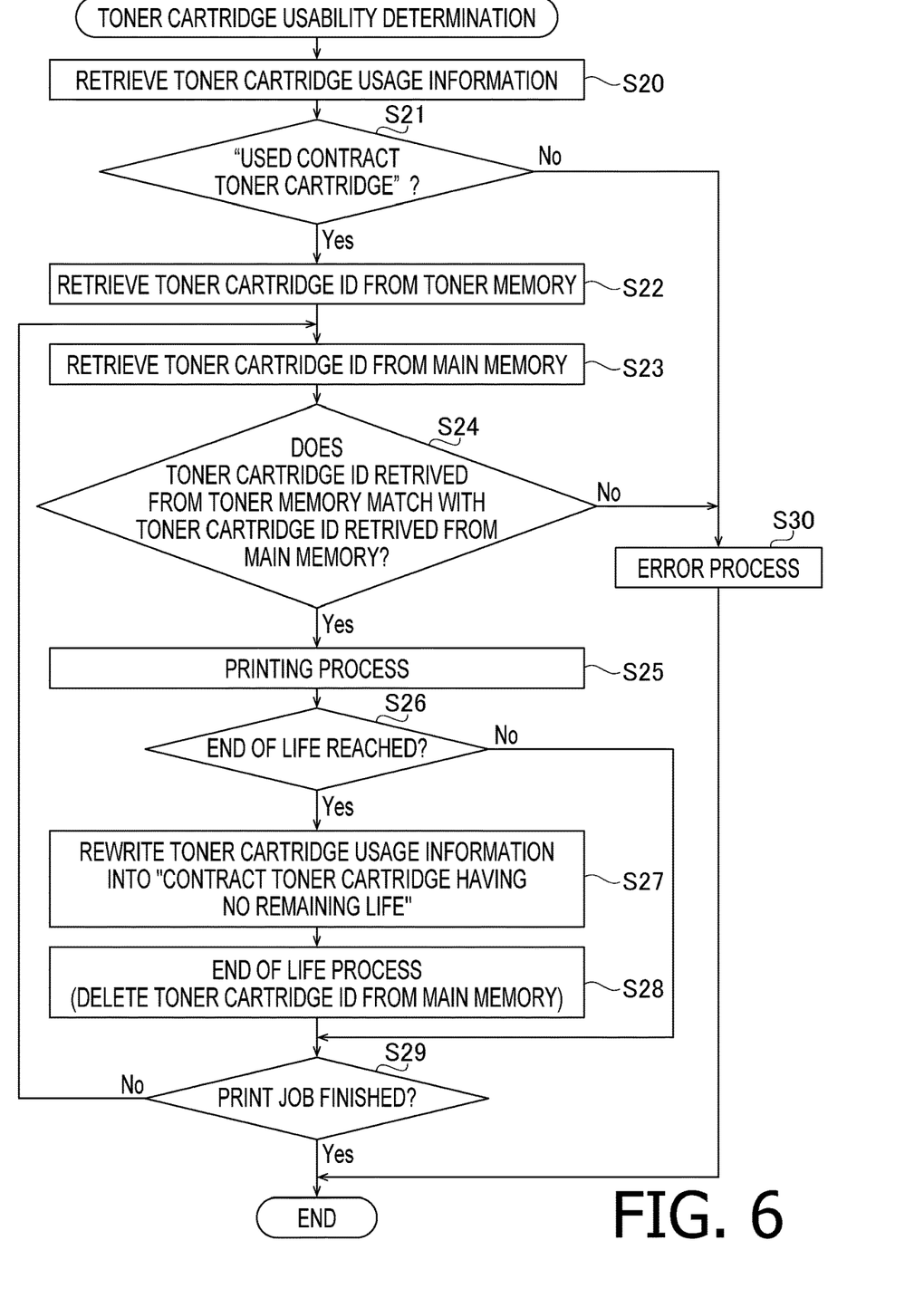
FIG. 6 is a diagram showing a flow of a toner cartridge usability determination process that the controller of the second embodiment executes in the contract mode.

FIG. 6 is a diagram showing a flow of a toner cartridge usability determination process that the controller 80 of the second embodiment executes in the contract mode. The toner cartridge usability determination process in the contract mode is almost the same as the toner cartridge usability determination process of the first embodiment shown in FIG. 4. It should be noted that, in the contract mode, the controller 80 determines in the second determination process S21 whether the toner cartridge usage information indicates "contract/used." Also, in the second rewriting process S27, the controller 80 rewrites the toner cartridge usage information stored in the first area 321 into information indicating "contract toner cartridge having no remaining life."

Figure 7:
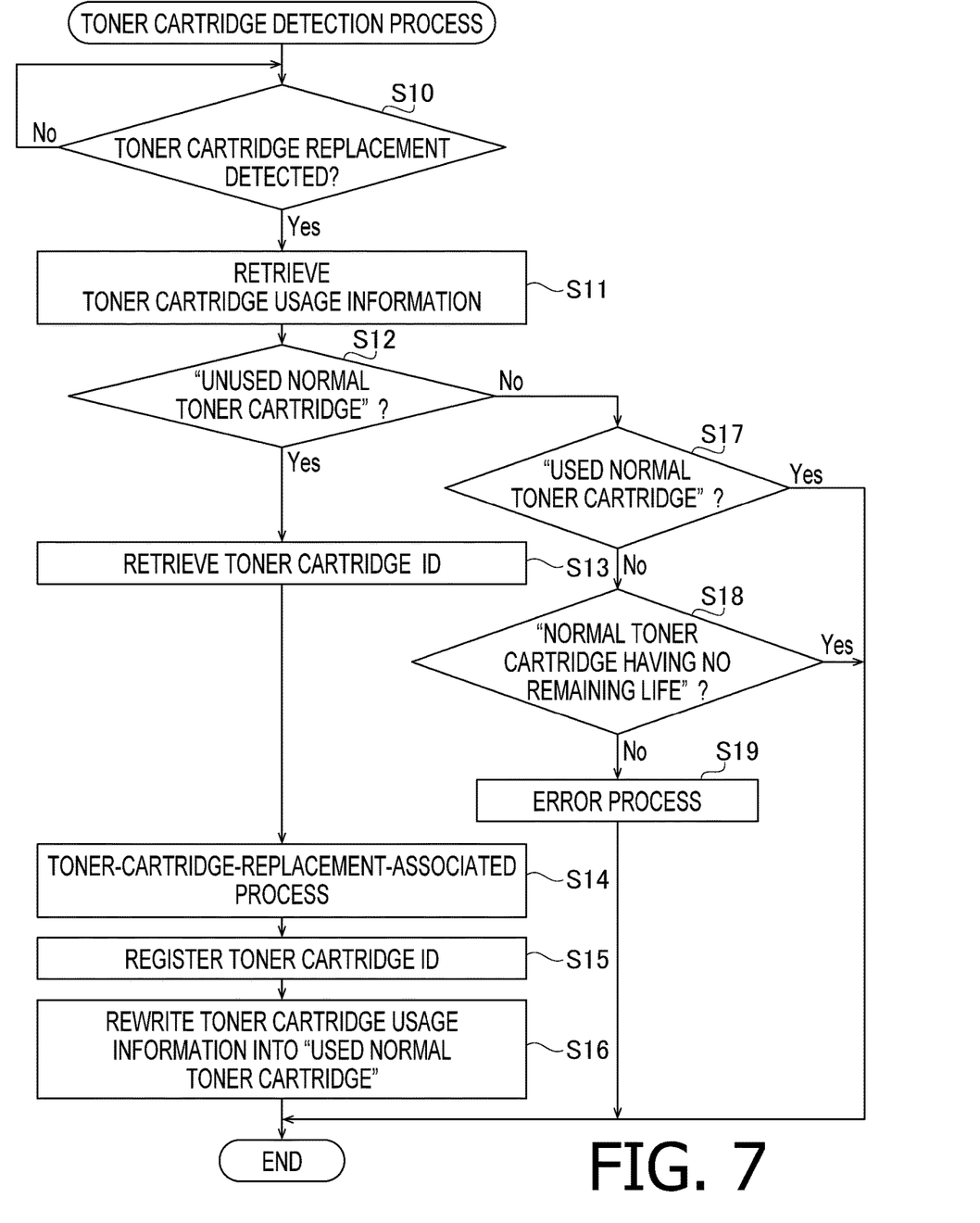
FIG. 7 is a diagram showing a flow of a toner cartridge detection process that the controller of the second embodiment executes in a normal mode.

FIG. 7 is a diagram showing a flow of a toner cartridge detection process that the controller 80 of the second embodiment executes in the normal mode. The toner cartridge detection process in the normal mode is almost the same as the toner cartridge detection process of the first embodiment shown in FIG. 3. It should be noted that, in the normal mode, the controller 80 determines in the first determination process S12 whether the toner cartridge usage information indicates "unused normal toner cartridge," determines in the determination process S17 whether the toner cartridge usage information indicates "used normal toner cartridge," and determines in the determination process S18 whether the toner cartridge usage information indicates "normal toner cartridge having no remaining life." Also, in the first rewriting process S16, the controller 80 rewrites the toner cartridge usage information stored in the first area into information indicating "used normal toner cartridge."

Figure 8:
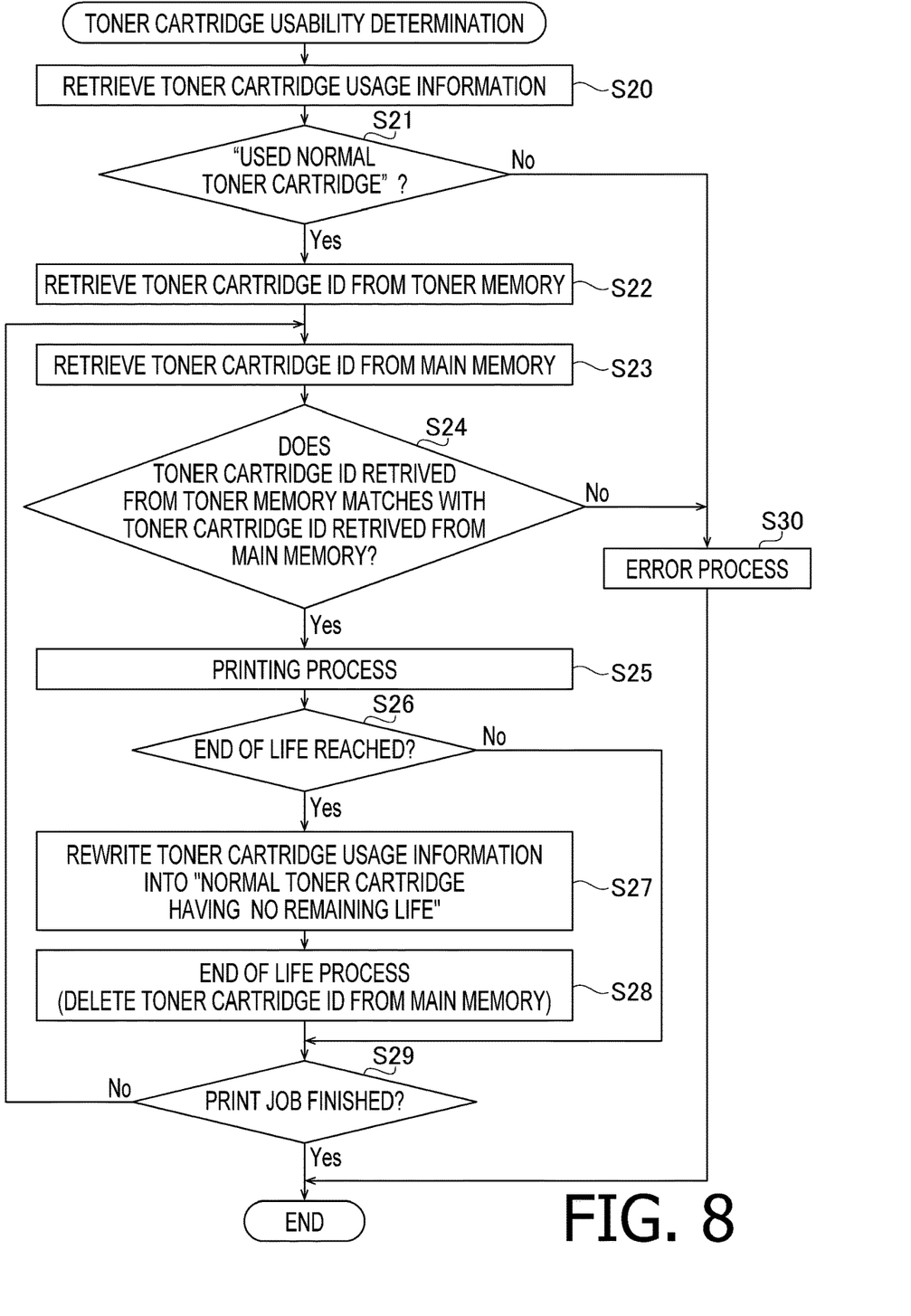
FIG. 8 is a diagram showing a flow of a toner cartridge usability determination process that the controller of the second embodiment executes in the normal mode.

FIG. 8 is a diagram showing a flow of a toner cartridge usability determination process that the controller 80 of the second embodiment executes in the normal mode. The toner cartridge usability determination process in the normal mode is almost the same as the toner cartridge usability determination process of the first embodiment shown in FIG. 4. It should be noted that, in the normal mode, the controller 80 determines in the second determination process S21 whether the toner cartridge usage information indicates "used normal toner cartridge." Also, in the second rewriting process S27, the controller 80 rewrites the toner cartridge usage information stored in the first area 321 into information indicating "normal toner cartridge having no remaining life."

In the second embodiment, if the toner cartridge usage information of the toner cartridge 30 does not comply with the operation mode of the controller 80, the error process will be executed. For example, if the operation mode of the controller 80 is set to the contract mode and the normal toner cartridge 30 is mounted to the main body 10, since the toner cartridge usage information of the normal toner cartridge 30 does not correspond to any of "unused contract toner cartridge," "contract/used" or "contract toner cartridge having no remaining life," the determination results in the first determination process S12, the determination process S17 and the determination process S18 of the toner cartridge detection process for the contract mode shown in FIG. 5 will all be NO and thus the error process S19 will be executed. Therefore, in the contract mode, it is possible to suppress usage of the normal toner cartridge 30 for printing. Similarly, if the controller 80 is set to the normal mode, by the toner cartridge detection process shown in FIG. 7, it is possible to suppress usage of the contract toner cartridge 30 for printing.

3. Third Embodiment

Figure 9:
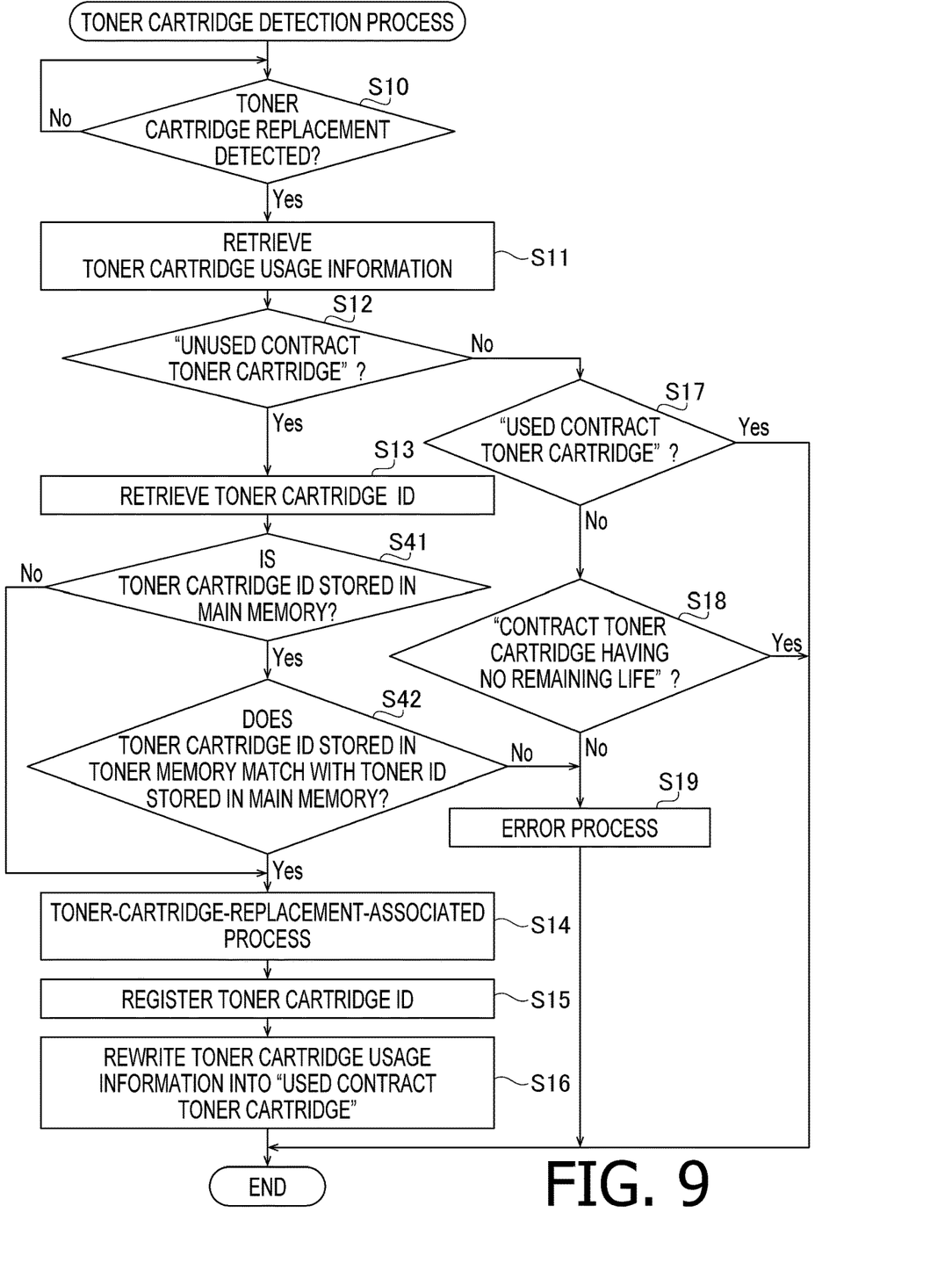
FIG. 9 is a diagram showing a flow of a toner cartridge detection process that a controller of the third embodiment executes in the contract mode.

FIG. 9 is a diagram showing a flow of a toner cartridge detection process that the controller 80 of the third embodiment executes in the contract mode. Among processes of the toner cartridge detection process for the contract mode according to the third embodiment, processes from the replacement detection determination process S10 to the reading process S13 are the same as those in the toner cartridge detection process for the contract mode shown in FIG. 5. However, in the third embodiment, after the toner cartridge ID is read by the reading process S13, the controller 80 executes a determination process S41 for determining whether the toner cartridge ID is stored in the main memory 15. If it is determined in the determination process S41 that the toner cartridge ID is stored in the main memory 15, the controller 80 executes a determination process S42 for determining whether the toner ID stored in the toner memory 32 matches with the toner ID stored in the main memory 15. If it is determined in the determination process S41 that the toner cartridge ID is not stored in the main memory 15, the controller 80 skips the determination process S42 and executes the toner-cartridge-replacement-associated process S14.

If it is determined in the determination process S42 that the toner ID stored in the toner memory 32 matches with the toner ID stored in the main memory 15, the controller 80 executes the toner-cartridge-replacement-associated process S14. If it is determined in the determination process S42 that the toner ID stored in the toner memory 32 does not match with the toner ID stored in the main memory 15, the controller 80 executes the error process S19.

The toner cartridge usability determination process for the contract mode in the third embodiment is the same as the toner cartridge usability determination process in the second embodiment shown in FIG. 6. That is, if it is determined in the life determination process S26 that the toner cartridge 30 has reached the end of life, the toner cartridge ID is deleted from the main memory 15 by the end of life process S28. On the other hand, if the toner cartridge 30 has not reached the end of life yet, the toner cartridge ID remains stored in the main memory 15.

A case where the contract toner cartridge 30 that was mounted to the image forming apparatus 1 is replaced with a new contract toner cartridge 30 before the former contract toner cartridge 30 reaches the end of life will now be considered. In this case, the new contract toner cartridge 30 is mounted to the image forming apparatus 1 in a state where the toner cartridge ID of the former contract toner cartridge 30 is stored in the main memory 15. Therefore, the controller 80 determines in the determination process S41 of the toner cartridge detection process shown in FIG. 9 that the toner cartridge ID is stored in the main memory 15 and executes the error process S19. Accordingly, usage of the new contract toner cartridge 30 is suppressed. Due to this configuration, in the third embodiment, while operating in the contract mode, it is possible to suppress replacement of the contract toner cartridge 30 until the contract toner cartridge 30 mounted to the image forming apparatus 1 reaches the end of life. As a result, it becomes possible to let the user use the contract toner cartridge 30 until the end of life and thus it becomes possible to reduce environmental load.

4. Modifications

Embodiments according to aspects the present disclosure has been described. However, aspects of the present disclosure are not limited to the embodiments described above but various modifications are possible.

A case where the consumable cartridge is the toner cartridge 30 has been described. However, the drum cartridge 20 may be the consumable cartridge. That is, drum cartridge usage information indicating whether the drum cartridge 20 is unused may be stored in the drum cartridge memory 22. As with the toner cartridge usage information, the drum cartridge usage information may for example indicate that the drum cartridge 20 is unused, that the drum cartridge 20 is used but there is life remaining, or that the drum cartridge 20 is used and the end of life is reached. The controller 80 may execute processes similar to the toner cartridge detection process shown in FIG. 3 and the toner cartridge usability determination process shown in FIG. 4 or the drum cartridge 20.

A case where the image forming apparatus 1 is an electro-photographic printer has been described. However, the image forming apparatus 1 may be an inkjet printer. In case of the inkjet printer, the consumable cartridge may be an ink cartridge for supplying ink. A tape cassette for supplying a tape as printing base may also be set as the consumable cartridge.

What is claimed is:

1. An image forming apparatus, comprising:
    a consumable cartridge comprising a cartridge memory having a first area configured to store usage information indicating whether the consumable cartridge is unused and a second area configured to store identifying information for identifying the consumable cartridge; and
    a main body comprising a main memory, and a controller, wherein the controller executes
        a storing process of storing the identifying information stored in the second area in the main memory when the usage information stored in the first area indicates that the consumable cartridge is unused,
        a first rewriting process of rewriting the usage information stored in the first area into information indicating that the consumable cartridge is used when the usage information stored in the first area indicates that the consumable cartridge is unused, and
        a first control process including a process of allowing the image forming apparatus to execute printing when the usage information stored in the first area indicates that the consumable cartridge is used and the identifying information stored in the second area is stored in the main memory, or a process of executing a specific error process when the usage information stored in the first area indicates that the consumable cartridge is used and the identifying information stored in the second area is not stored in the main memory,
    wherein, when the consumable cartridge is mounted to the main body, the controller executes a first determination process of determining whether the usage information stored in the first area indicates that the consumable cartridge is unused,
    wherein the storing process includes a process of storing the identifying information stored in the second area in the main memory when it is determined in the first determination process that the usage information stored in the first area indicates that the consumable cartridges is unused, and
    wherein the first rewriting process includes a process of rewriting the usage information stored in the first area into information indicating that the consumable cartridge is used when it is determined in the first determination process that the usage information stored in the first area indicates that the consumable cartridge is unused.

2. The image forming apparatus according to claim 1, wherein, when the consumable cartridge is mounted to the main body, the controller executes a second determination process of determining whether the usage information stored in the first area indicates that the consumable cartridge is used.

3. The image forming apparatus according to claim 2, wherein, when it is determined in the second determination process that the usage information stored in the first area indicates that the consumable cartridges is used, the controller executes a third determination process of determining whether the identifying information stored in the second area is stored in the main memory,
    wherein, the first control process includes a process of allowing the image forming apparatus to execute printing when it is determined in the third determination process that the identifying information stored in the second area is stored in the main memory, or a process of executing a specific error process when it is determined in the third determination process that the identifying information stored in the second area is not stored in the main memory.

4. The image forming apparatus according to claim 1, wherein the error process is a process of inhibiting printing.

5. The image forming apparatus according to claim 1, wherein the usage information indicates any one of that the consumable cartridge is unused, that the consumable cartridge is used and there is life remaining, and that the consumable cartridge is used and has reached the end of life.

6. The image forming apparatus according to claim 5, wherein the cartridge memory further includes a third area configured to store life information indicating life of the consumable cartridge,
    wherein, when the usage information stored in the first area indicates that the consumable cartridge is used and there is life remaining, the controller executes a life determination process of determining whether the life information stored in the third area exceeds a set threshold value, and
    wherein, when it is determined in the life determination process that the life information stored in the third area exceeds the set threshold value, the controller executes a second rewriting process of rewriting the usage information stored in the first area into information indicating that the consumable cartridge is used and there is no remaining life.

7. The image forming apparatus according to claim 6, wherein, when it is determined in the life determination process that the life information stored in the third area exceeds the set threshold value, the controller executes a deleting process of deleting the identifying information stored in the second area from the main memory.

8. The image forming apparatus according to claim 1, wherein the usage information further indicates information indicating usage state of each of the plurality of operation modes, and
    wherein the controller executes
        an operation mode setting process of setting the operation mode of the controller to one of the plurality of operation modes, and
        a second control process of executing a specific error process in when it is determined, in the first determination process which further includes a process of determining whether the operation mode indicated by the usage information stored in the first area matches with the operation mode that is set by the operation mode setting process, that the operation mode indicated by the usage information stored in the first area does not match with the operation mode that is set by the operation mode setting process.

9. The image forming apparatus according to claim 8, wherein the operation mode indicates a contract mode or a normal mode.

10. The image forming apparatus according to claim 1, wherein the usage information is encrypted and stored in in the first area, and
    wherein the controller executes a decryption process of decrypting the encrypted usage information.

11. The image forming apparatus according to claim 1, wherein the consumable cartridge is a drum cartridge, a toner cartridge or an ink cartridge.

12. A consumable cartridge comprising a cartridge memory including a first area storing usage information indicating a usage state of the consumable cartridge and a second area storing identifying information for identifying the consumable cartridge,
    wherein the identifying information stored in the second area is to be stored in a main memory of an image forming apparatus and the usage information stored in the first area is rewritable into information indicating that the consumable cartridge is used when the usage information stored in the first area indicates that the consumable cartridge is unused in response to determining that the usage information stored in the first area indicates that the consumable cartridge is unused,
    wherein printing of the image forming apparatus is to be allowed when the usage information stored in the first area indicates that the consumable cartridge is used and the identifying information stored in the second area is stored in the main memory, and
    wherein a specific error process of the image forming apparatus is to be executed when the usage information stored in the first area indicates that the consumable cartridge is used and the identifying information stored in the second area is not stored in the main memory.

13. A consumable cartridge comprising a cartridge memory including a first area storing usage information indicating a usage state of the consumable cartridge and a second area storing identifying information for identifying the consumable cartridge,
    wherein the identifying information stored in the second area is to be stored in a main memory of an image forming apparatus and the usage information stored in the first area is rewritable into information indicating that the consumable cartridge is used when the usage information stored in the first area indicates that the consumable cartridge is unused,
    wherein printing of the image forming apparatus is to be allowed when the usage information stored in the first area indicates that the consumable cartridge is used and the identifying information stored in the second area is stored in the main memory, and
    wherein a specific error process of the image forming apparatus is to be executed when the usage information stored in the first area indicates that the consumable cartridge is used and the identifying information stored in the second area is not stored in the main memory,
    wherein the cartridge memory further includes a third area storing life information indicating life of the consumable cartridge,
    wherein the usage information indicates any one of that the consumable cartridge is unused, that the consumable cartridge is used and there is life remaining, and that the consumable cartridge is used and has reached the end of life, and
    wherein, when the usage information stored in the first area indicates that the consumable cartridge is used and there is life remaining, the usage information stored in the first area is rewritable into information indicating that the consumable cartridge is used and there is no remaining life in response to determining that the life information stored in the third area exceeds the set threshold value.

14. An image forming apparatus, comprising:
a consumable cartridge comprising a cartridge memory having a first area configured to store usage information indicating whether the consumable cartridge is unused and a second area configured to store identifying information for identifying the consumable cartridge; and
a main body comprising a main memory, and a controller,
    wherein the controller executes
        a storing process of storing the identifying information stored in the second area in the main memory when the usage information stored in the first area indicates that the consumable cartridge is unused,
        a first rewriting process of rewriting the usage information stored in the first area into information indicating that the consumable cartridge is used when the usage information stored in the first area indicates that the consumable cartridge is unused, and
        a first control process including a process of allowing the image forming apparatus to execute printing when the usage information stored in the first area indicates that the consumable cartridge is used and the identifying information stored in the second area is stored in the main memory, or a process of executing a specific error process when the usage information stored in the first area indicates that the consumable cartridge is used and the identifying information stored in the second area is not stored in the main memory,
    wherein, when the consumable cartridge is mounted to the main body, the controller executes a second determination process of determining whether the usage information stored in the first area indicates that the consumable cartridge is used, wherein, when it is determined in the second determination process that the usage information stored in the first area indicates that the consumable cartridges is used, the controller executes a third determination process of determining whether the identifying information stored in the second area is stored in the main memory, wherein, the first control process further includes
- a process of allowing the image forming apparatus to execute printing when it is determined in the third determination process that the identifying information stored in the second area is stored in the main memory, or
- a process of executing a specific error process when it is determined in the third determination process that the identifying information stored in the second area is not stored in the main memory.

15. The image forming apparatus according to claim 14, wherein the error process is a process of inhibiting printing.

16. The image forming apparatus according to claim 14, wherein the usage information is encrypted and stored in the first area, and
    wherein the controller executes a decryption process of decrypting the encrypted usage information.

17. The image forming apparatus according to claim 14, wherein the consumable cartridge is a drum cartridge, a toner cartridge or an ink cartridge.

18. An image forming apparatus, comprising:
    a consumable cartridge comprising a cartridge memory having a first area configured to store usage information indicating whether the consumable cartridge is unused and a second area configured to store identifying information for identifying the consumable cartridge; and
    a main body comprising a main memory, and a controller, wherein the controller executes
    - a storing process of storing the identifying information stored in the second area in the main memory when the usage information stored in the first area indicates that the consumable cartridge is unused,
    - a first rewriting process of rewriting the usage information stored in the first area into information indicating that the consumable cartridge is used when the usage information stored in the first area indicates that the consumable cartridge is unused, and
    - a first control process including a process of allowing the image forming apparatus to execute printing when the usage information stored in the first area indicates that the consumable cartridge is used and the identifying information stored in the second area is stored in the main memory, or a process of executing a specific error process when the usage information stored in the first area indicates that the consumable cartridge is used and the identifying information stored in the second area is not stored in the main memory,
    wherein the usage information indicates any one of that the consumable cartridge is unused, that the consumable cartridge is used and there is life remaining, and that the consumable cartridge is used and has reached the end of life,
    wherein the cartridge memory further includes a third area configured to store life information indicating life of the consumable cartridge,
    wherein, when the usage information stored in the first area indicates that the consumable cartridge is used and there is life remaining, the controller executes a life determination process of determining whether the life information stored in the third area exceeds a set threshold value, and
    wherein, when it is determined in the life determination process that the life information stored in the third area exceeds the set threshold value, the controller executes a second rewriting process of rewriting the usage information stored in the first area into information indicating that the consumable cartridge is used and there is no remaining life.

19. The image forming apparatus according to claim 18, wherein, when it is determined in the life determination process that the life information stored in the third area exceeds the set threshold value, the controller executes a deleting process of deleting the identifying information stored in the second area from the main memory.

20. The image forming apparatus according to claim 18, wherein the error process is a process of inhibiting printing.

21. The image forming apparatus according to claim 18, wherein the usage information is encrypted and stored in the first area, and
    wherein the controller executes a decryption process of decrypting the encrypted usage information.

22. The image forming apparatus according to claim 18, wherein the consumable cartridge is a drum cartridge, a toner cartridge or an ink cartridge.

* * * * *

UNITED STATES PATENT AND TRADEMARK OFFICE
CERTIFICATE OF CORRECTION

PATENT NO. : 11,132,155 B2
APPLICATION NO. : 17/002861
DATED : September 28, 2021
INVENTOR(S) : Yuki Fukusada It is certified that error appears in the above-identified patent and that said Letters Patent is hereby corrected as shown below:

In the Claims

Claim 8, Column 15, Line 5:
Please change "indicating usage state of each of the plurality of operation" to -- indicating a usage state of each of the plurality of operation --

Claim 8, Column 15, Lines 12-13:
Please change "process in when it is determined, in the first determination process which further includes a process of" to -- process when it is determined, in the first determination process which further includes a process of --

Signed and Sealed this
Sixth Day of June, 2023

Katherine Kelly Vidal
*Director of the United States Patent and Trademark Office*